(12) United States Patent
Chigros et al.

(10) Patent No.: US 11,090,888 B2
(45) Date of Patent: Aug. 17, 2021

(54) MOLDING ELEMENT COMPRISING A PARTICULAR ASSEMBLY MEANS

(71) Applicant: COMPAGNIE GENERALE DES ETABLISSEMENTS MICHELIN, Clermont-Ferrand (FR)

(72) Inventors: Pierre Chigros, Clermont-Ferrand (FR); Damien Bardin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/768,438

(22) PCT Filed: Nov. 27, 2018

(86) PCT No.: PCT/IB2018/059360
§ 371 (c)(1),
(2) Date: May 29, 2020

(87) PCT Pub. No.: WO2019/106538
PCT Pub. Date: Jun. 6, 2019

(65) Prior Publication Data
US 2020/0384712 A1    Dec. 10, 2020

(30) Foreign Application Priority Data

Nov. 30, 2017  (FR) .................................. 1771286

(51) Int. Cl.
*B29D 30/06*     (2006.01)
*B60C 11/12*     (2006.01)
*B29C 33/30*     (2006.01)

(52) U.S. Cl.
CPC .......... *B29D 30/0606* (2013.01); *B60C 11/12* (2013.01); *B29C 33/302* (2013.01);
(Continued)

(58) Field of Classification Search
CPC ........ B29D 30/0606; B29D 2030/0612; B29D 2030/0613
See application file for complete search history.

(56) References Cited

U.S. PATENT DOCUMENTS 2,224,337 A  * 12/1940  Bostwick ........... B29D 30/0606
                                                   29/515
3,570,571 A  *  3/1971  Riches ................. B60C 11/042
                                                   152/209.21
(Continued)

FOREIGN PATENT DOCUMENTS

EP      0 858 875 A1    8/1998
JP      3-90317     *   4/1991
(Continued)

OTHER PUBLICATIONS

International Search Report dated Jan. 29, 2019, in corresponding PCT/IB2018/059360 (6 pages).

*Primary Examiner* — James P Mackey
(74) *Attorney, Agent, or Firm* — Venable LLP

(57) ABSTRACT

A set (1) of moulding elements intended to be added to a mould comprise a main moulding element (10) and a secondary moulding element (20) comprising an edge (21), said main moulding element (10) comprising a contact zone (11) adapted to be in contact with all or part of the edge (21) of the secondary element, said contact zone (11) not being flat, and the edge (21) of said secondary moulding element (20) comprising at least one recessed portion (22) complementary to the non-flat contact zone (11) of the main element.

6 Claims, 1 Drawing Sheet

(52) U.S. Cl.
CPC ............... *B29D 2030/0612* (2013.01); *B29D 2030/0613* (2013.01)

(56) References Cited

U.S. PATENT DOCUMENTS

| | | | | |
|---|---|---|---|---|
| 6,143,223 | A * | 11/2000 | Merino Lopez ... | B29D 30/0606 264/219 |
| 6,193,492 | B1 * | 2/2001 | Lagnier ................... | B29C 33/48 152/DIG. 3 |
| 6,408,911 | B1 * | 6/2002 | Tanabe ............... | B29D 30/0606 152/209.5 |
| 6,454,554 | B1 * | 9/2002 | Lopez ..................... | B29C 33/44 425/28.1 |
| 9,022,083 | B2 * | 5/2015 | Voss .................... | B60C 11/0306 152/209.18 |
| 9,205,613 | B2 * | 12/2015 | Montbel ............ | B29D 30/0606 |
| 10,315,339 | B2 | 6/2019 | Jenkins et al. | |
| 10,773,556 | B2 * | 9/2020 | Lawson ............. | B60C 11/1204 |
| 10,882,362 | B2 * | 1/2021 | Lawson ............. | B60C 11/1263 |
| 2007/0295434 | A1 | 12/2007 | Nguyen et al. | |
| 2010/0078107 | A1 * | 4/2010 | Bonhomme ........... | B60C 11/12 152/209.25 |
| 2011/0180191 | A1 * | 7/2011 | Christenbury ......... | B60C 11/12 152/209.18 |
| 2017/0203365 | A1 * | 7/2017 | Pays ..................... | B22F 3/1055 |
| 2018/0147748 | A1 | 5/2018 | Jenkins et al. | |
| 2018/0162016 | A1 | 6/2018 | Reeb et al. | |

FOREIGN PATENT DOCUMENTS

| | | | |
|---|---|---|---|
| JP | 11-58386 | * | 3/1999 |
| WO | 2015/086974 | A1 | 6/2015 |
| WO | 2016/200695 | A1 | 12/2016 |

\* cited by examiner

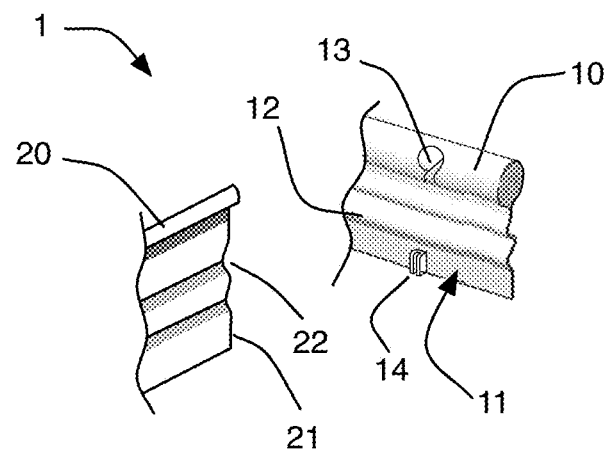
Figure 1
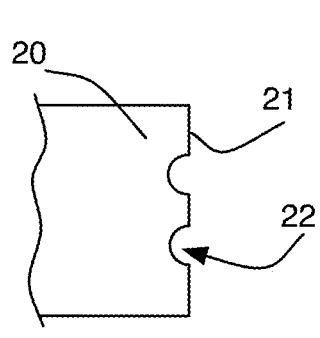 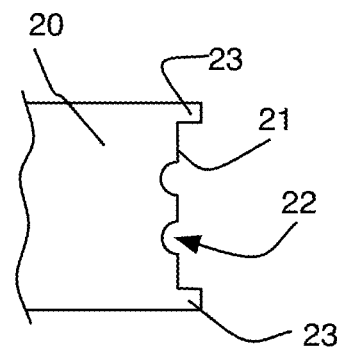 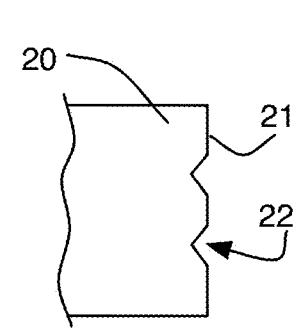
Figure 2a     Figure 2b     Figure 2c

US 11,090,888 B2

MOLDING ELEMENT COMPRISING A PARTICULAR ASSEMBLY MEANS

TECHNICAL FIELD

The present invention relates to a moulding element for moulding a cut in a tread of a tyre. The invention also relates to a set of moulding elements forming a network of moulding elements in a mould.

PRIOR ART

WO2016200695 describes a set of moulding elements for a lining of a mould intended for the vulcanization of a tread of a tyre. The moulding elements are assembled to one another by means of a slot in which an edge of the element to be assembled is inserted. To achieve this assembly, the contact interface between the moulding elements to be assembled must be flat or devoid of any relief. If a relief is present on a face of a moulding element, this element is interrupted in the assembly zone, thereby creating a discontinuity or interruption, liable to weaken the moulding element on which the discontinuity is present.

Definitions

"Tyre" means any type of resilient tyre whether or not it is subjected to an internal pressure.

"Tread" of a tyre means a quantity of rubber material delimited by lateral surfaces and by two main surfaces, one of which is intended to come into contact with a roadway when the tyre is being used and the other of which is oriented towards the inside of the tyre.

"Cut in a tread" means either a fine cut, also referred to as a sipe, or a wide cut, also referred to as a groove.

"Moulding element" means an element placed in a mould, for making cuts in the tread of a tyre. A moulding element for making a sipe in the tread is called a blade. A moulding element for making a groove in the tread is called a bar.

SUMMARY OF THE INVENTION

First of all, a first objective of the invention consists in providing a mode of assembly between moulding elements making it possible to accommodate zones provided with particular shapes, reliefs or textures at the interface of the assembly zone.

A second objective of the invention consists in proposing a mode of assembly between moulding elements making it possible to obtain efficient, reliable assembly without affecting the rigidity of one or other of the assembled elements.

To this end, the invention provides a moulding element intended to be added to a mould for vulcanizing a tyre tread, said moulding element comprising an edge on one end of said moulding element, said edge being adapted to come into contact with the other moulding element, said edge comprising at least one recessed portion, said recessed portion being adapted to be complementary to a zone of the other moulding element, said contact zone not being flat.

Such a mode of assembly between the moulding elements makes it possible to ensure continuity of any element, such as an undulation, a texture, or the like, present on an assembly face of the main moulding element. For example, in the case of an undulation serving to stiffen the main moulding element, the features of the invention make it possible to ensure continuity of the stiffening effect.

According to an advantageous embodiment, the moulding element comprises assembly means for assembling said moulding element with the other moulding element. These assembly means facilitate the implementation of the moulding elements, and their installation in a mould.

Advantageously, the recessed portion is curvilinear.

Also advantageously, the assembly means protrude relative to the edge of said moulding element.

The invention also provides a set of moulding elements intended to be added to a mould for vulcanizing a tyre tread, said set comprising a main moulding element and a secondary moulding element comprising an edge, said main moulding element comprising a contact zone adapted to be in contact with all or part of the edge of the secondary element, said contact zone not being flat, the edge of said secondary moulding element comprising at least one recessed portion complementary to the non-flat contact zone of the main element.

According to an advantageous embodiment, the main moulding element comprises at least one undulation, said undulation crossing, without being interrupted, the contact zone.

According to another advantageous embodiment, the main element comprises a texture (such as a series of spikes, strips or holes for creating hairs), said texture crossing, without being interrupted, the contact zone.

Advantageously, said set comprises assembly means.

Also advantageously, the assembly means comprise a notch in the main element for receiving part of the edge of the secondary element.

According to an advantageous embodiment, the assembly means comprise at least one protrusion protruding from the edge of the secondary element.

According to an advantageous embodiment, the moulding elements are blades.

The invention also provides a mould for vulcanizing a tyre tread, comprising a plurality of sets of moulding elements as described above.

DESCRIPTION OF THE FIGURES

Further features and advantages of the invention will emerge from the following description, provided by way of example, without intended limitation, with reference to the appended drawings in which:

FIG. 1 is a perspective view of an example of a set of moulding elements comprising a main moulding element and a secondary moulding element;

FIGS. 2a, 2b and 2c are side views of alternative embodiments of the secondary moulding element of FIG. 1.

In the description below, substantially identical or similar elements will be designated by identical references.

DETAILED DESCRIPTION OF THE INVENTION

FIG. 1 shows an exemplary embodiment of a set of moulding elements used for moulding cuts in a tread of a tyre. The example shown consists of a main moulding element 10 and a secondary moulding element 20.

On at least one of its faces, the main moulding element 10 has a contact zone 11. This zone is intended to be in contact with an edge 21 of the secondary moulding element 20.

As shown in FIG. 1, the contact zone 11 is not flat. It includes, for example, at least one undulation 12. This undulation 12 extends continuously all along the contact zone 11, without interruption. The fact that this undulation is uninterrupted makes it possible to avoid zones of weakness on the main moulding element 10. According to an alternative not shown, the contact zone comprises a texture (such as a series of spikes, strips or holes for creating hairs). This texture crosses the contact zone continuously, without interruption. Whatever the type of relief used, this relief extends continuously over the entire length of the contact zone 11.

In order to achieve an assembly of the two moulding elements 10 and 20 substantially without a space or gap in the interface zone between the two moulding elements, the contact zone 11 and the edge 21 are provided with complementary profiles. The contour or profile of the edge 21 fits snugly with all or part of the relief on the contact zone 11. An assembly is thus obtained with contact between the two moulding elements over substantially the entire length of this contact zone.

In the example shown, the continuity between the two assembled profiles is implemented by virtue of a particular arrangement provided on at least one of the edges 21 of the secondary moulding element 20. The edge 21 has at least one recessed portion 22. The cut corresponds to the profile of the non-flat surface of the contact zone 11 of the main moulding element 10.

In the examples shown in FIGS. 1, 2a and 2b, the recessed portion 22 of the moulding element is curvilinear, and forms a profile complementary to the profile of the undulation 12 of the main moulding element. The recessed portion 22 therefore has a profile which perfectly matches the profile of the contact face 11 of the main moulding element 10.

FIG. 2c shows an alternative profile of an edge 21, the recessed portion or portions 22 of which are in the shape of a triangle. Other shapes are also possible for the recessed portions, depending on the configuration of the non-flat zone 11 of the main moulding element with which they are to be assembled.

Assembly Means

In order to assemble the moulding elements 10 and 20, the main moulding element 10 and/or the secondary moulding element 20 may comprise assembly means, as shown in the examples of FIGS. 1 and 2b.

In the example of FIG. 2b, the edge 21 of the secondary element comprises one or more protrusions 23, extending from the edge, and protruding towards the main blade 10 to interact with the latter. Such a protrusion may for example interact with the main blade 10 by insertion into a notch 13, such as that shown in the example of FIG. 1. This results in a precise assembly, with the moulding elements strictly aligned.

A clip 14, projecting from the contact zone 11 of a main moulding element 10, in a direction substantially perpendicular to the latter, may also be used to attach a secondary moulding element. One or more clips 14 may be provided. Several clips 14 may be aligned on the contact zone to attach an edge 21 at several points, for a particularly effective assembly.

Also as an alternative, an assembly may involve both one or more clips 14 and one or more protrusions 23.

The invention claimed is:

1. A set of molding elements intended to be added to a mold for vulcanizing a tire tread, the set comprising a main molding element and a secondary molding element,
   wherein the secondary molding element comprises an edge, the main molding element comprises on at least one contact face, a contact zone configured to be in contact with all or part of the edge of the secondary molding element, the contact zone is not flat, and the edge of the secondary molding element comprises a double cut having a profile complementary to a profile of a double undulation of the main molding element thereby matching a profile of the contact face of the main molding element.

2. The set according to claim 1, wherein the set further comprises assembly means for assembling the secondary molding element to the main molding element.

3. The set according to claim 2, wherein the assembly means comprise a notch in the main molding element for receiving part of the edge of the secondary molding element.

4. The set according to claim 2, wherein the assembly means comprise at least one protrusion protruding from the edge of the secondary molding element.

5. The set according to claim 1, wherein the main and secondary molding elements are blades.

6. A mold for vulcanizing a tire tread comprising a plurality of sets of molding elements according to claim 1.

* * * * *